US008629714B2

United States Patent
Ng et al.

(10) Patent No.: US 8,629,714 B2
(45) Date of Patent: Jan. 14, 2014

(54) WAKE-UP CIRCUITS, DEVICES AND METHODS FOR GALVANIC ISOLATORS

(75) Inventors: Gek Yong Ng, Singapore (SG); Peng Siang Seet, Singapore (SG); Fun Kok Chow, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1238 days.

(21) Appl. No.: 12/491,354

(22) Filed: Jun. 25, 2009

(65) Prior Publication Data

US 2010/0329363 A1    Dec. 30, 2010

(51) Int. Cl.
*G05F 1/10*    (2006.01)

(52) U.S. Cl.
USPC ............................. 327/544; 327/545; 709/202

(58) Field of Classification Search
USPC ........ 327/544–545; 709/202–203; 340/693.3, 340/286.2
See application file for complete search history.

(56) References Cited

U.S. PATENT DOCUMENTS

| | | | |
|---|---|---|---|
| 6,198,995 B1 * | 3/2001 | Settles et al. ................. | 701/29.1 |
| 6,442,271 B1 | 8/2002 | Tuttle et al. | |
| 6,671,660 B2 | 12/2003 | Freed | |
| 6,848,059 B2 * | 1/2005 | Bullman et al. ............... | 713/323 |
| 7,248,146 B1 | 7/2007 | Kammer et al. | |
| 2007/0205872 A1 | 9/2007 | Kim et al. | |

OTHER PUBLICATIONS

"iCoupler Products with isoPower Technology: Signal and Power Transfer Across Isolation Barrier Uisng Microtransformers," Baoxing Chen, Analog Devices, Inc., 2006.
"High Rate Ultra Wideband PHY and MAC Standard," ECMA International, Standard ECMA-368, 3rd Edition, Dec. 2008.

* cited by examiner

*Primary Examiner* — An Luu (57) ABSTRACT

According to one embodiment, there is provided a method of reducing the amount of power consumed by a galvanic isolator. A transmitter transmits a wake-up signal to a receiver located across an isolation medium when the transmitter is ready or preparing to transmit data or power signals to a receiver, which is operably connected to a sensing circuit. The sensing circuit receives the wake-up signal through the isolation medium, which may be operably connected to and powered substantially continuously or intermittently by a first power source. In response to the sensing circuit receiving the wake-up signal, the receiver is powered up from a sleep mode to an operating mode. After a period of time $t_{RDY}$ has passed since the wake-up signal was transmitted, a signature pattern is transmitted from the transmitter to the sensing circuit through the isolation medium. Next, the sensing circuit or the receiver verifies the validity of the signature pattern. If the signature pattern is determined at to be valid, the receiver is enabled to receive the data or power signals from the transmitter. The transmitter then transmits the data or power signals from the transmitter through the isolation medium to the receiver.

35 Claims, 6 Drawing Sheets

WAKE-UP CIRCUITS, DEVICES AND METHODS FOR GALVANIC ISOLATORS

FIELD OF THE INVENTION

Many of the various embodiments of the invention described herein relate to the field of data signal and power transformers for galvanic isolators and coil transducers, and more particularly to devices employing magnetic, capacitive or optical means to transmit and receive data and/or power signals across a dielectric or isolation barrier.

BACKGROUND

High voltage isolation communication devices known in the prior art include optical, magnetic and capacitive devices. Prior art optical devices typically achieve high voltage isolation by employing LEDs and corresponding photodiodes to transmit and receive light signals, usually require high power levels, and suffer from operational and design constraints when multiple communication channels are required. Prior art magnetic devices typically achieve high voltage isolation by employing opposing inductively-coupled coils, and usually require high power levels (especially when high data rates are required). Prior art capacitive devices achieve voltage isolation by employing multiple pairs of transmitting and receiving electrodes, where for example a first pair of electrodes is employed to transmit and receive data, and a second pair of electrodes is employed to refresh or maintain the transmitted signals.

The design of galvanic isolators presents several formidable technical challenges, such as how to reduce power consumption when no data or power signals are being transmitted or received thereby.

Figure 1:
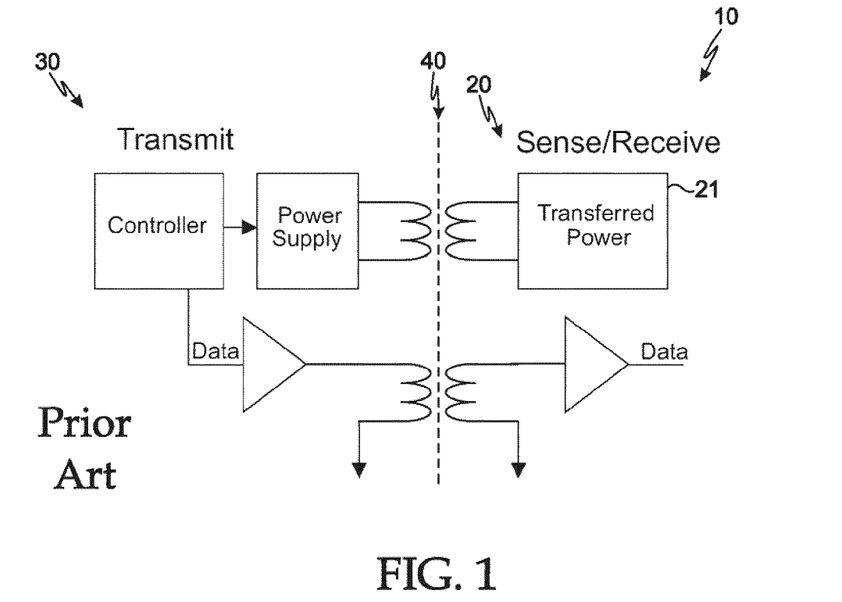
FIG. 1 shows a prior art isolator with DC-DC converter.

One way to reduce power consumption on the sense side of a galvanic isolator is to provide an isolated power supply to the sense side from the transmit side via an integrated DC-DC converter. See FIG. 1, where a circuit diagram of a prior art isolator 10 with an integrated DC-DC converter is illustrated. When transmitter 30 needs to send a data or power signal across galvanic isolation medium 40, it will first perform a DC-DC power transfer across a dedicated power channel to power up receiver 20 located on the sense side of galvanic isolator 40. Once sense side power supply 21 is up, transmitter 30 can then perform a transfer to send the data signals to the sense side from the transmit side. The disadvantage of this method is that the efficiency of power transfer is typically not good due to losses that occur in the isolation medium. One way to improve power transfer efficiency is to design the isolation medium in the power channel to be more efficient than that corresponding to the data channel. However, the disadvantage of doing so is that the system becomes more complex, and thus more expensive.

Figure 2:
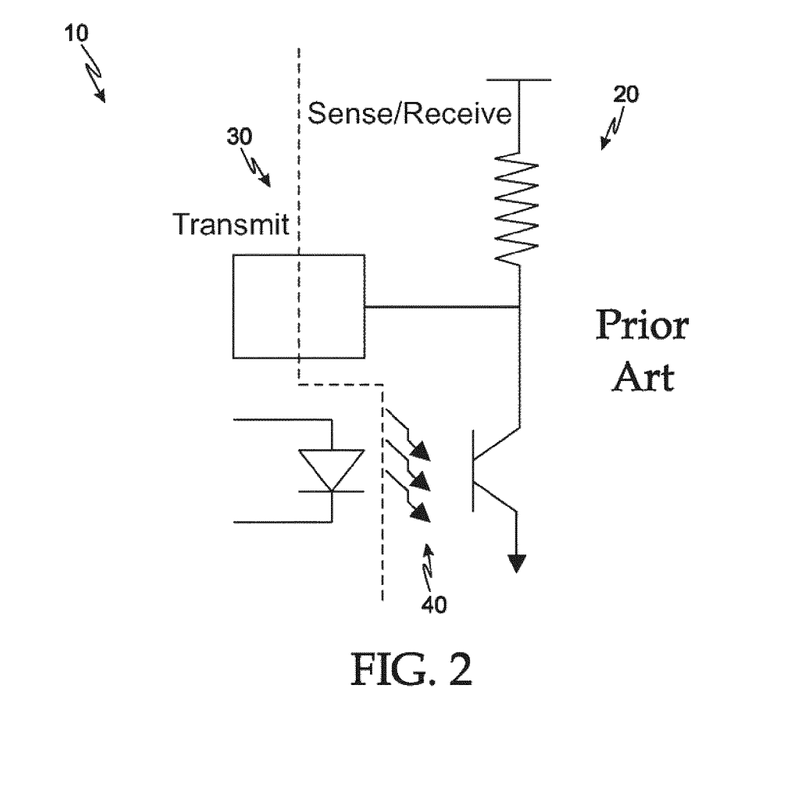
FIG. 2 shows a schematic diagram of prior art optical wake-up signal transmitting and receiving circuits.

Another way to reduce power consumption in a galvanic isolator on the sense side is to use an external discrete opto-coupler to send a wake-up pulse from the transmit side 30 to the receive side 20. FIG. 2 shows a prior art circuit 10 that employs an external discrete opto-coupler to receive a wake-up pulse. Once receive side 20 has been powered up, data signals can be transmitted to the sense side 20 from the transmit side 30. The disadvantage of this method is that the extra components required to send and receive the wake-up signal increase board area and also lead to increased costs for electronic components.

See also Baoxing Chen, "iCoupler® Products with isoPower™ Technology: Signal and Power Transfer Across Isolation Barrier Using Microtransformers", published by Analog Devices, where further information concerning galvanic isolators is to be found.

What is needed is a galvanic isolator that consumes reduced power, that may be built at low cost, or that has other advantages that will become apparent after having read and understood the specification and drawings hereof.

SUMMARY

In some embodiments, there is provided a method of reducing the amount of power consumed by a galvanic isolator comprising transmitting a wake-up signal across an isolation medium from a transmitter when the transmitter is ready or preparing to transmit data or power signals to a receiver operably connected to a sensing circuit, receiving, with the sensing circuit, the wake-up signal through the isolation medium, in response to the sensing circuit receiving the wake-up signal, powering the receiver up from a sleep mode to an operating mode, after a period of time $t_{RDY}$ has passed since the wake-up signal was transmitted, transmitting a signature pattern from the transmitter to the sensing circuit through the isolation medium, verifying, with the sensing circuit or the receiver, the validity of the signature pattern and, if the signature pattern is determined to be valid, enabling the receiver to receive the data or power signals, transmitting the data or power signals from the transmitter through the isolation medium, and receiving, with the receiver, the data or power signals.

In other embodiments, there is provided a reduced power consumption galvanic isolator comprising a transmitter, a receiver having a sensing circuit operably connected thereto, and a galvanic isolation medium located between the transmitter and the receiver, wherein the transmitter is configured to transmit a wake-up signal across the isolation medium to the sensing circuit when the transmitter is ready or preparing to transmit data or power signals to the receiver, the sensing circuit is configured to receive the wake-up signal and cause the receiver to be powered up from a sleep mode to an operating mode when the wake-up signal is received, the transmitter further being configured to transmit a signature pattern to the sensing circuit or the receiver after a period of time $t_{RDY}$ has passed since the wake-up signal was transmitted, the sensing circuit or the receiver being configured to verify the validity of the signature pattern and, if the signature pattern is determined to be valid, to enable the receiver to receive the data or power signals, the receiver being configured to consume a reduced amount of electrical power during the sleep mode with respect to the operating mode.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

This following U.S. patent applications are incorporated by reference herein, each in its respective entirety: (a) U.S. patent application Ser. No. 12/032,165 filed Feb. 15, 2008 entitled "High Voltage Isolation Semiconductor Capacitor Digital Communication Device and Corresponding Package" to Fun Kok Chow et al. (hereafter "the '165 patent application"); (b) U.S. patent application Ser. No. 12/059,979 filed Mar. 31, 2008 entitled "Galvanic Isolators and Coil Transducers" to Fouquet et al. (hereafter "the '979 patent application"); (c) U.S. patent application Ser. No. 12/059,747 filed Mar. 31, 2008 entitled "Coil Transducer with Reduced Arcing and Improved High Voltage Breakdown Performance Characteristics" to Fouquet et al. (hereafter "the '747 patent application"); (d) U.S. patent application Ser. No. 12/370,208 filed Feb. 12, 2009 entitled "High Voltage Hold-off Coil Transducer" to Fouquet et al. (hereafter "the '208 patent application"); (e) U.S. patent application Ser. No. 12/393,596 filed Feb. 26, 2009 entitled "Minimizing Electromagnetic Interference in Coil Transducers" to Fouquet et al. (hereafter "the '596 patent application"), and (f) U.S. patent application Ser. No. 12/397,254 filed Mar. 31, 2008 entitled "High Voltage Isolation Dual Capacitor Communication System" to Gek Yong Ng et al. (hereafter "the '254 patent application").

In the following detailed descriptions, specific details are provided to impart a thorough understanding of some the various possible embodiments of the devices and methods disclosed herein. Upon having read and understood the specification, claims and drawings hereof, however, those skilled in the art will understand that some embodiments may be practiced without hewing to the specific details set forth herein.

In the drawings, some, but not all, possible embodiments are illustrated, and further may not be shown to scale.

Figure 3:
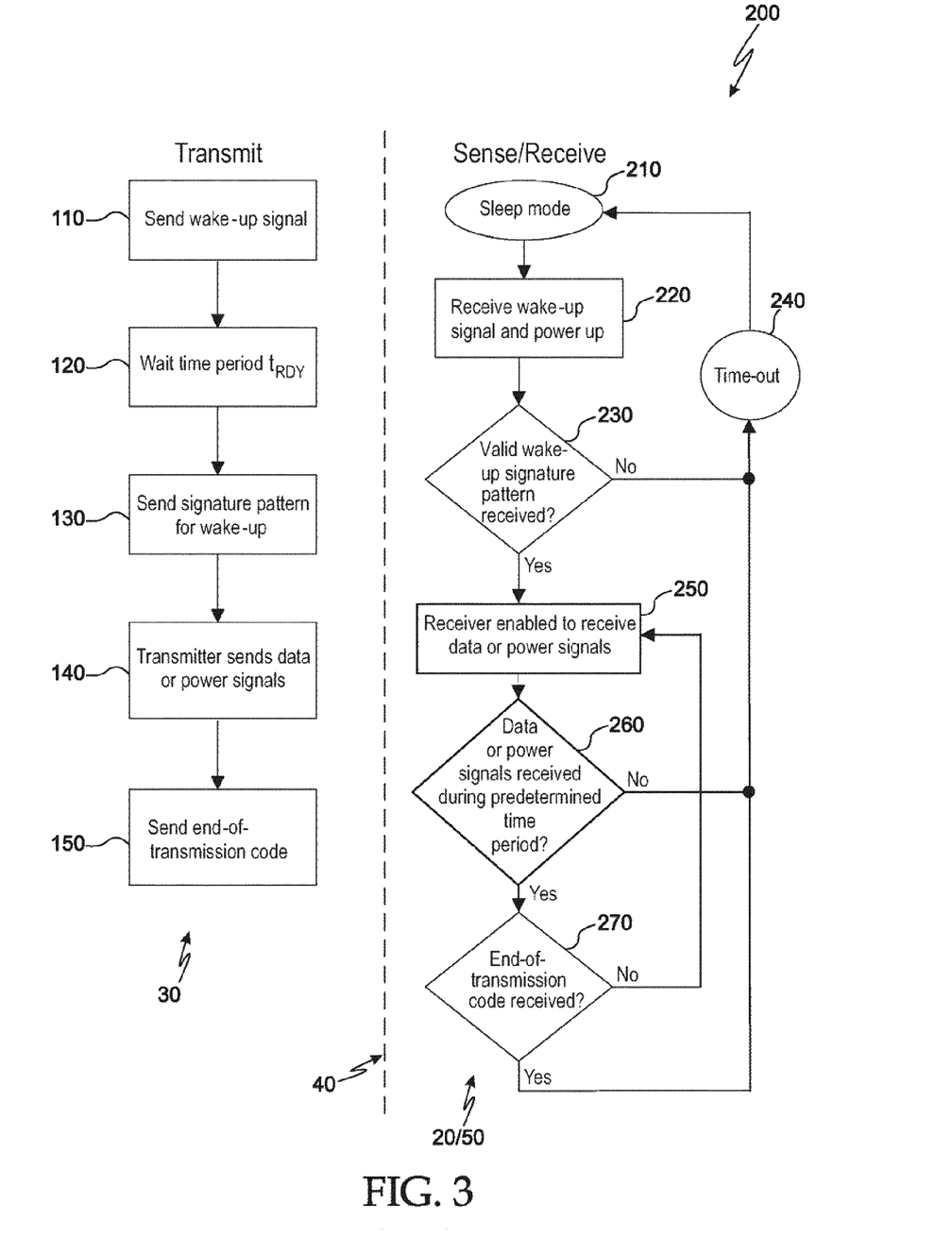
FIG. 3 shows sense and transmit flow diagrams according to one embodiment.

According to one embodiment, and as illustrated in FIG. 3, there is provided method 200 of reducing the amount of power consumed by galvanic isolator 10. At step 110, transmitter 30 transmits a wake-up signal to receiver 20 located across isolation medium 40 when transmitter 30 is ready or preparing to transmit data or power signals to receiver 20, which is operably connected to sensing circuit 50. At step 220 sensing circuit 50 receives the wake-up signal through isolation medium 40, and is preferably operably connected to and powered substantially continuously by a first power source. In response to sensing circuit 50 receiving the wake-up signal, receiver 20 is powered up from sleep mode 210 to an operating mode. After a period of time $t_{RDY}$ has passed at step 120 since the wake-up signal was transmitted, a signature pattern is transmitted from transmitter 30 to sensing circuit 50 through isolation medium 40 at step 130. Next, at step 230 sensing circuit 50 or receiver 20 verifies the validity of the signature pattern. If the signature pattern is determined at step 230 to be valid, receiver 20 is enabled at step 250 to receive the data or power signals from transmitter 30. At step 140 transmitter 30 transmits the data or power signals from transmitter 30 through isolation medium 40 to receiver 20.

As further shown at steps 150 and 260 in FIG. 3, according to one embodiment the method may further comprise determining at step 260 whether the data or power signals have been received during a predetermined period of time since the signature pattern was received. If the predetermined period of time passes without any data or power signals being transmitted to receiver 20 by transmitter 30, receiver 20 may be powered from the operating mode to sleep mode 210. In addition, receiver 20 may be powered down from the operating mode to sleep mode 210 after the predetermined period of time has lapsed if the signature pattern is determined to be invalid. Contrariwise, if data or power signals are received during the predetermined period of time, and the signature pattern is determined to be valid, steps 150 ad 270 are carried out, where an end-of-transmission code is sent at step 150 from transmitter 30 to sensing circuit 50 or receiver 20 after all the data or power signals have been transmitted to receiver 20. At step 270 receiver 20 is powered down from the operating mode to sleep mode 210 in response to the end-of-transmission code at step 150 being received by sensing circuit 50 or receiver 20.

In the various methods, isolation medium 40 may be capacitive, magnetic or optical. The methods described above may be carried out according to several different embodiments, more about which is said below. In the general case, and irrespective of whether isolation medium 40 is capacitive, magnetic or optical, a reduced power consumption galvanic isolator is provided that comprises transmitter 30, receiver 20 having sensing circuit 50 operably connected thereto, and a galvanic isolation medium 40 located between transmitter 30 and receiver 20. Transmitter 30 is configured to transmit a wake-up signal across isolation medium 40 to sensing circuit 50 when transmitter 30 is ready or preparing to transmit data or power signals to receiver 20. Sensing circuit 50 is operably connected to and powered substantially continuously by a first power source. Sensing circuit 50 is configured to receive the wake-up signal and cause receiver 20 to be powered up from a sleep mode to an operating mode when the wake-up signal is received. Transmitter 30 is further configured to transmit a signature pattern to sensing circuit 50 or receiver 20 after a period of time $t_{RDY}$ has passed since the wake-up signal was transmitted. Sensing circuit 50 or receiver 20 are configured to verify the validity of the signature pattern and, if the signature pattern is determined to be valid, to enable receiver 20 to receive the data or power signals from transmitter 30. Receiver 20 is configured to consume a reduced amount of electrical power during the sleep mode with respect to the operating mode.

Such a reduced power consumption galvanic isolator may further comprise an integrated circuit (IC), where transmitter 30 and receiver 20 are incorporated into one or separate ICs. The transmitter and receiver ICs may be encapsulated or overmolded to form a single package. In addition, receiver 20 and transmitter 30 may be connected electrically to separate respective grounds. In one embodiment, transmitter 30 is configured to transmit differential signals, and receiver 20 is configured to receive differential signals. Receiver 20 and transmitter 30 may also comprise a common mode rejection (CMR) circuit. At least portions of transmitter 30 and receiver 20 are preferably fabricated using one or more of a CMOS process, a Bipolar-CMOS process, and a combined Bipolar-CMOS-DMOS (BCD) process. Galvanic isolator 10 may be encapsulated at least partially in polyimide or plastic.

Continuing to refer to FIG. 3, there is provided a method for waking up the sense side of isolator 10 from an ultra low power or sleep mode. In conventional isolated devices, the sense or detect side is maintained in a normal operating mode so that it is always ready to receive a signal that might be transmitted to it from the transmit side located on the opposite side of the isolation medium separating the sense and transmit sides. This means that the sense side is consuming power even when there is no active information transfer, resulting in undesired waste of power. The methods described herein permit the isolated sense side to operate in an ultra low power sleep mode, which can then be awakened and set to the normal operating mode from the transmit side via a wake-up signal. The wake-up signal can be transmitted through a dedicated channel or time-multiplexed on a data channel. The various methods may include steps for robustness to ensure that the wake-up signaling is genuine and not due to noise glitches or common mode ground transients in the system. The methods reduce power consumption of an isolated device in an idle state as the sense side can be kept in sleep mode. The methods may be employed in all isolation medium types used and may be used, by way of example, in isolated optical, capacitive or magnetic devices, for example.

The various methods and devices disclosed herein offer a few key advantages with respect to conventional prior art methods of keeping the sense side always in power-up mode, transferring power to the sense side through a DC-DC converter, or using external discrete opto-coupler. Power consumption on the sense side is zero or ultra low as it is kept in sleep mode when no signals are being transmitted to receiver 20 from transmitter 30. In the sleep mode, receiver circuitry is powered down without cutting off completely the power supply on the sense side (i.e., power is still delivered to sensing circuit 50 when receiver 20 enters sleep mode). The power supply for sensing circuit 50 may be provided by an external power source, which is typically almost always available. The signature pattern, verification of the signature pattern, and the end-of-transmission code ensures system robustness against noise glitches or common mode ground transients so that a genuine wake-up call may be reliably and effectively detected. The wake up signal and the data or power signals may be transferred through a single channel, for example via time-multiplexing, or may be transferred separately through two or more separate channels.

In a preferred embodiment, the wake-up channel uses the same isolation medium 40 having the same signal transfer characteristics as the data signal channel, and therefore does not require a separate isolation channel having higher efficiency than the normal data signal channel. The signature pattern that is used for waking up the Receiver can be signals having a fixed or predetermined pattern, and must occur within a preset time frame. Frequency or/and time-based signals can also be used to form the signature pattern.

The various embodiments presented herein offer unique solutions to wake up the sense side of a galvanic isolator operating in ultra low power sleep mode to conserve power. In preferred embodiments, the transmit and sense sides sit on two different IC dies that are galvanically isolated by isolation medium 40. A suitable isolation medium is preferably capacitive or magnetic in nature, although optical isolators are also contemplated. The wake-up signal can be transmitted through a dedicated channel or it can be time-multiplexed on a data channel. The sense side operating in sleep mode must be able to receive the initial wake-up signal from transmitter 30 and then proceed to power up receiver 20.

Figure 4:
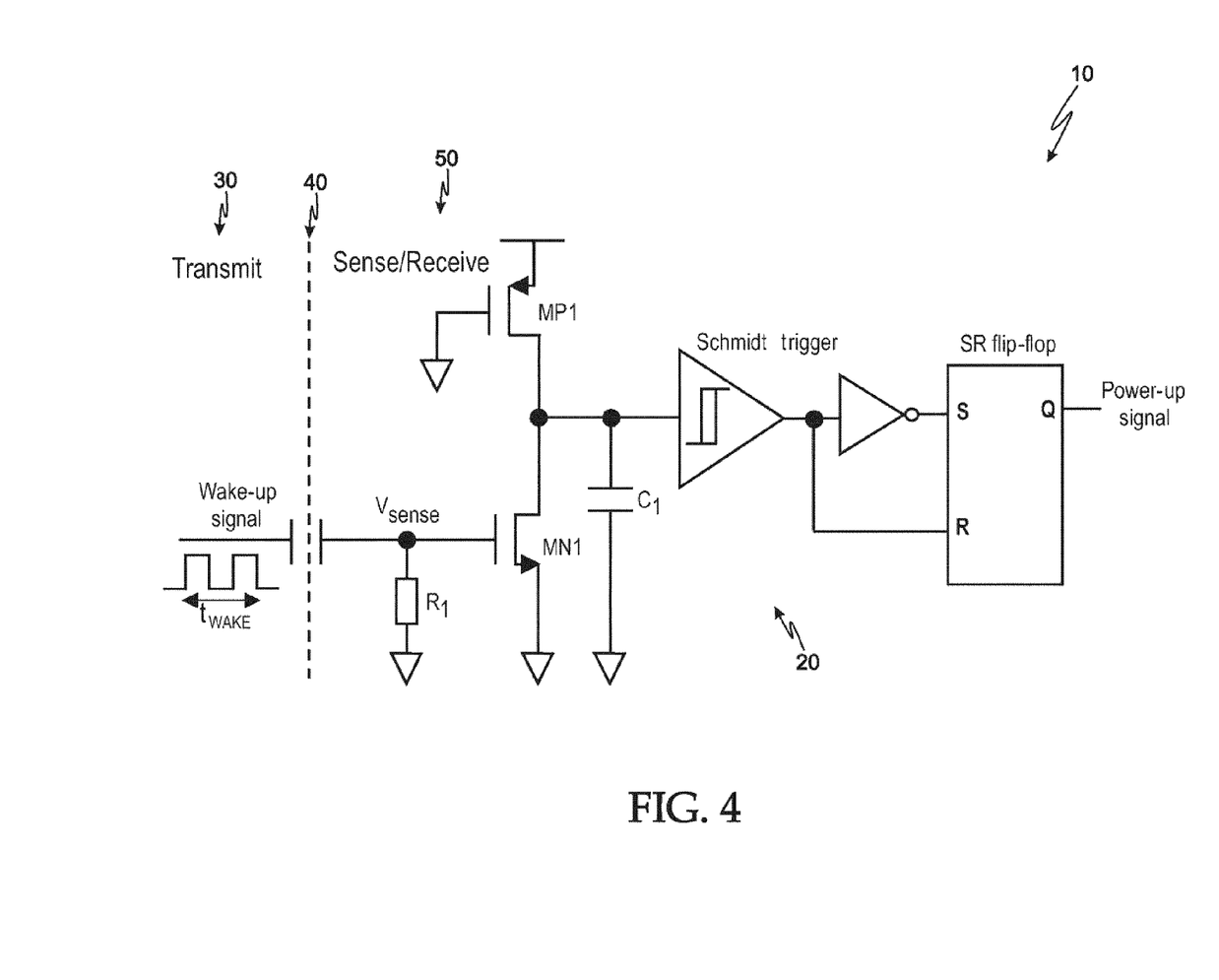
FIG. 4 shows one embodiment of a wake-up circuit.

In the case of a capacitive isolation medium, one embodiment of a circuit implementation of the wake-up function on the sense side is shown in FIG. 4. When the device is in an idle state with no signal transmission across isolation medium 40 occurring, the sense side is in sleep mode. In sleep mode, the voltage $V_{sense}$ is zero and so NMOS transistor MN1 is turned off. PMOS current source MP1 charges capacitor C1 and pulls the input of the Schmidt trigger to high. The output of the Schmidt trigger and its complement drive the Reset and Set inputs of the SR flip-flop, respectively. The SR flip-flop outputs an active high power-up signal to the associated circuitry in receiver 20. In the sleep mode, the flip-flop is in a reset state and so the power-up signal is low, which powers down all circuitry in receiver 20 on the sense side, except for sensing circuitry 50, which continues to operate and consume a reduced amount of power. After the sense side is powered down, no power is consumed by receiver 20. The digital logic blocks do not consume current in a static condition. Hence the sense side is kept in a zero or ultra-low power state in sleep mode. When the transmit side wishes to send data or power signals to the sense side, it first issues a wake-up signal, which in one embodiment is a train of continuous voltage pulses of duration $t_{WAKE}$ across isolation channel 40. The $V_{sense}$ voltage developed across resistor R1 is used to drive the gate of the NMOS transistor MN1, and turns it on if its threshold voltage is exceeded. The input of the Schmidt trigger is thus pulled low by MN1 and its output driving the Set input goes high. The SR flip-flop is then set and sends a high signal to the power-up signal. This in turns powers up the circuitry in receiver 20 on the sense side, which is then ready to receive the signature pattern, followed by the data or power signals. At the end of signal transmission, the wake-up pulses go away and the $V_{sense}$ node naturally discharges to zero through resistor R1. The flip-flop resets again and receiver 20 goes back to sleep. Filter capacitor C1 and the Schmidt trigger provide added noise immunity to the system by preventing noise glitches or common mode ground transients from causing a false triggering.

Figure 5:
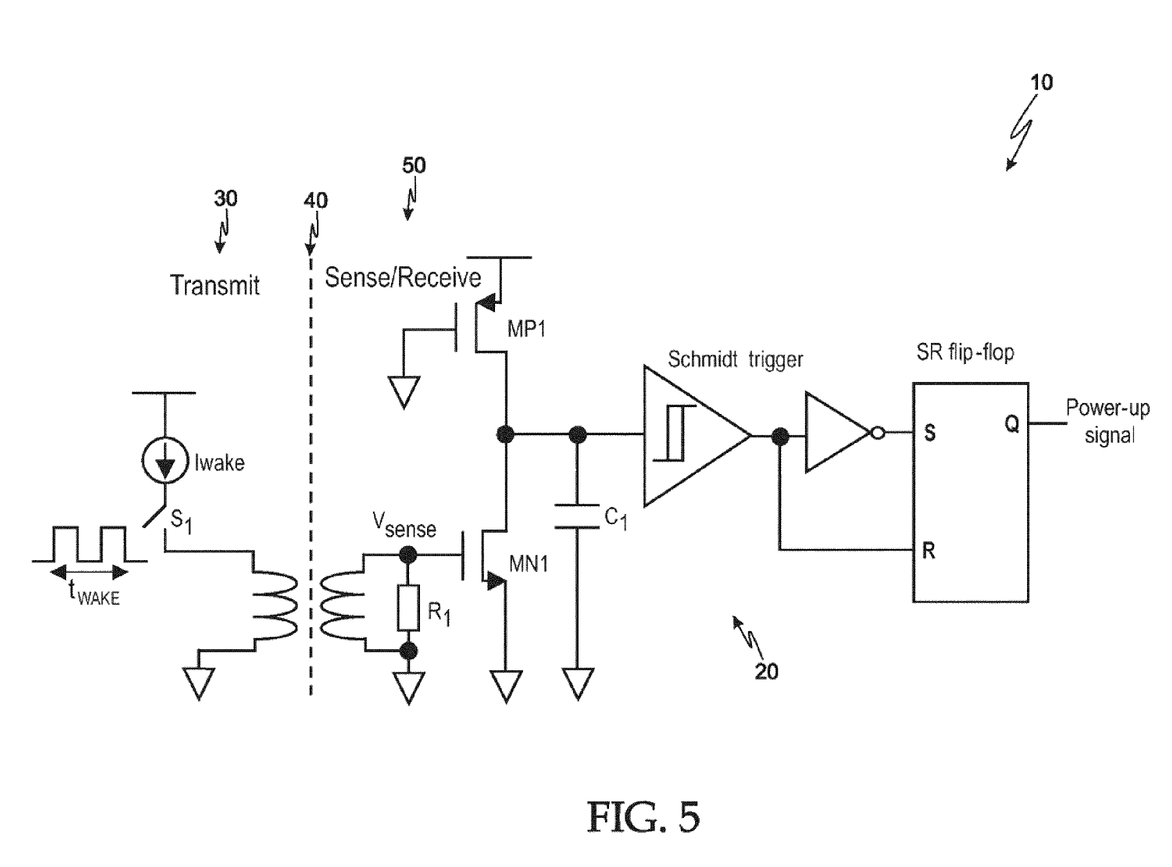
FIG. 5 shows another embodiment of a wake-up circuit.

In the case of an inductive isolation medium, one embodiment of a circuit implementation of the wake-up function on the sense side is shown in FIG. 5. In this case, the isolation medium is an inductor and the wake-up signal pulse train is used to drive the switch S1 to inject current $I_{WAKE}$ into the primary coil. When the switch S1 is turned on, the current in the primary coil couples over to the secondary coil and causes a $V_{sense}$ voltage to be developed across resistor R1. The circuit functions in a similar way as the circuit illustrated in FIG. 4.

Figure 6:
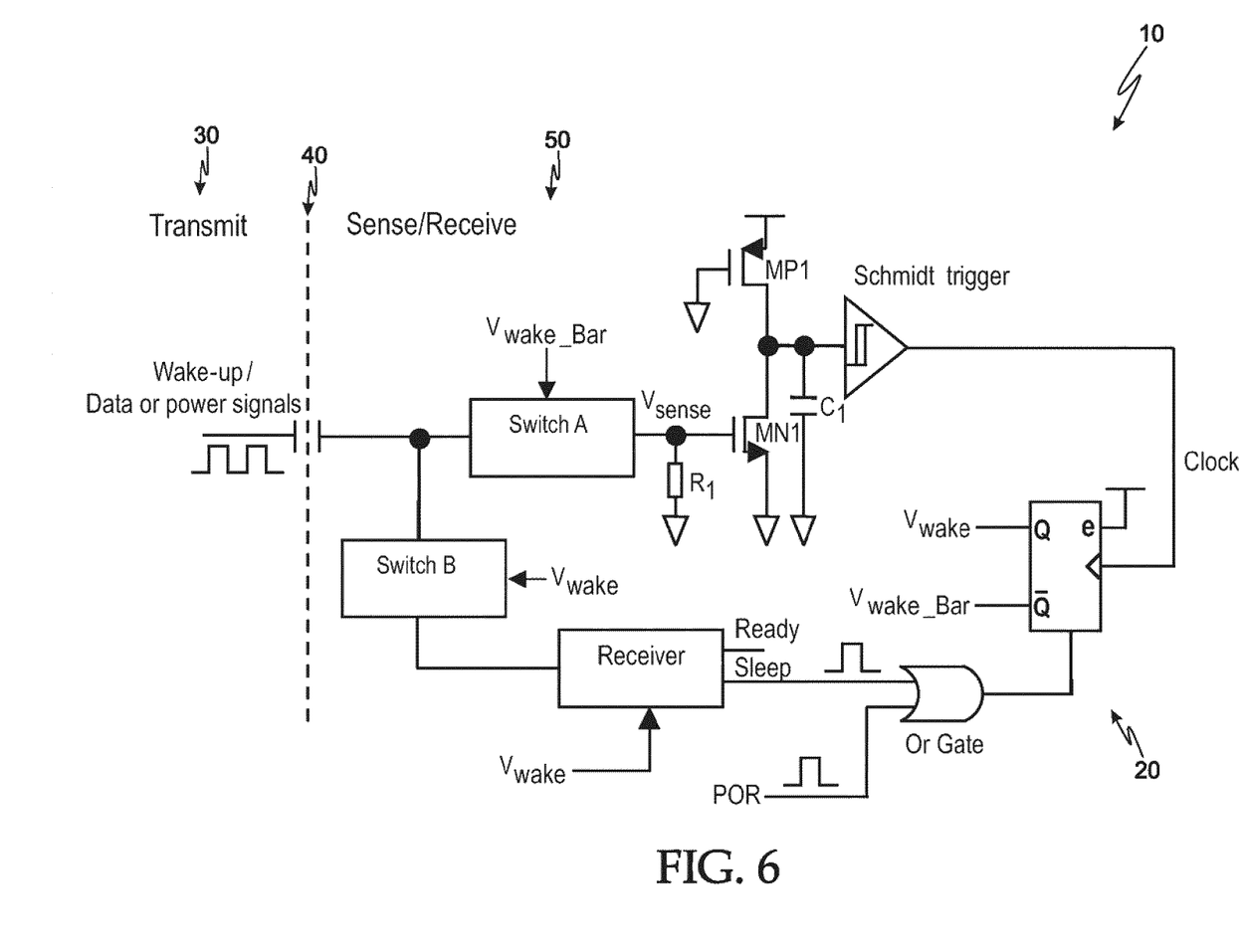
FIG. 6 shows yet another embodiment of a wake-up circuit.

FIG. 6 shows a block diagram for transferring both the data and wake up signal through a single isolation channel. In FIG. 6, the wake up signal and the data or power signals are transferred through the same isolation channel from the transmit side to the sense/receive side. POR is the power on reset signal. Once the power supply at the sense/receive side is up and ready, POR sends a pulse signal to reset the D-flip-flop. This sets the initial state for the logic signals $V_{wake}$ and $V_{wake\_Bar}$ and causes Switch A to turn on and Switch B to turn off. This also puts receiver 20 in sleep mode. While Switch A is on, it allows the signal to be passed over to sensing circuit 50. If a wake-up signal is sensed, a clock signal is generated and sent to the D-flip-flop. This inverts the logic of $V_{wake}$ and $V_{wake\_Bar}$, turning off Switch A and turning on Switch B. Thereafter, no signal can pass through Switch A, and signals $V_{wake}$ and $V_{wake\_Bar}$ remain in their current states. At the same time, $V_{wake}$ powers up receiver 20. When Switch B is turned on, data or power signals can be passed over to receiver 20. Receiver 20 then checks whether the signal pattern that is being received is a valid signature pattern. If the signature pattern is valid and presented within a preset time window, receiver 20 remains powered up. If the signature pattern received is noise or an invalid signal that causes a false trigger, a sleep pulse is sent to the D-flip-flop to reset $V_{wake}$ and $V_{wake\_Bar}$. In this case, $V_{wake}$ shut down receiver 20 and turns off Switch B, while $V_{wake\_Bar}$ turns on Switch A. This permits data or power signals to pass through Switch A to sensing circuit 50. The process of checking for a valid pattern signature is repeated.

Figure 7:
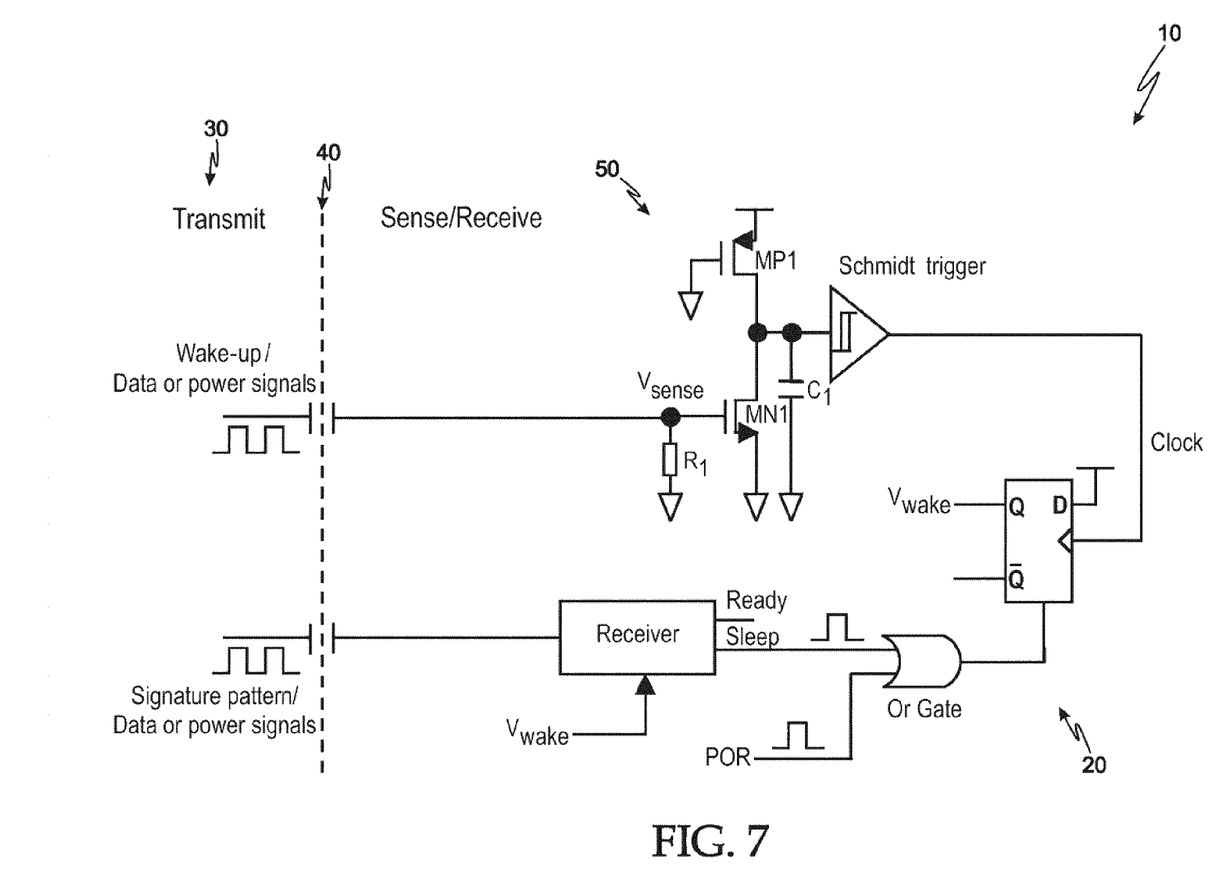
FIG. 7 shows still another embodiment of a wake-up circuit.

FIG. 7 shows a block diagram for transferring data or power signals and the wake-up signal through a multi-isolation channel from the transmit side to the sense/receive side. As shown in FIG. 7, once the power supply at the sense/receive side is up and ready, POR sends a pulse signal to the D-flip-flop. This sets the initial state for the logic signal $V_{wake}$. The $V_{wake}$ signal puts receiver 20 to sleep initially. If a wake-up signal is sensed, a signal is generated and sent to the D-Flip-Flop to invert the logic of $V_{wake}$. At the same time, $V_{wake}$ also powers up receiver 20. Once receiver 20 has been powered up, it checks for the signature pattern that has been transmitted thereto. If the signature pattern is valid and occurs within a preset time window, receiver 20 remains powered up and perform its normal functions. If the signature pattern received is invalid, a sleep pulse is sent to the D-flip-flop to reset $V_{wake}$ back to its initial state. Once $V_{wake}$ has been reset, receiver 20 shuts down and is placed back in sleep mode. Sensing circuit 50 then begins to search for a wake-up signal to wake receiver 20 up again. The process of checking for a valid signature pattern is thus repeated.

To wake up receiver 20, a valid signature pattern must be received by receiver 20 and/or sensing circuit 50. A valid signature pattern can consist of signals of a certain pattern, and preferably must be sent within a preset time window. Frequency and/or time base signals may be used to constitute a valid signature pattern. Once receiver 20 detects a valid signature pattern, receiver 20 remains awakened until a sleep command is received thereby. In the same manner, a sleep command can also be a signature pattern that is recognized by receiver 20 and/or sensing circuit 50 as an instruction to power down receiver 20. At the end of data or power signal transmission, transmitter 30 can issue a sleep mode signature pattern to put the Receiver back to sleep.

Note further that the wake-up signal, the signature pattern, and the data and power signals may be transmitted and received in isolator 10 using a single channel, or two or more channels, according to the particular application and design at hand. Moreover, the wake-up signal, the signature pattern, and the data and power signals may be transmitted and received in isolator 10 using time multiplexing techniques well known to those skilled in the art, by means of a single channel or two or more channels.

In addition, in preferred embodiments isolator 10 is implemented using CMOS, Bipolar-CMOS, and/or combined Bipolar-CMOS-DMOS (BCD) or other suitable chip fabrication processes such that isolator 10 forms a single chip, integrated circuit, package or hybrid containing all of transmitter 30, isolation medium 40, receiver 20 and sensing circuit 50.

Moreover, a first power source may be configured to power sensing circuit 50 continuously or substantially continuously. Alternatively, the first power source may be configured to power sensing circuit 50 intermittently, most preferably according to a power-on schedule for sensing circuit 50 that is synchronized with transmissions of wake-up signals by transmitter 30 such that wake-up signals are transmitted by transmitter 30 when sensing circuit 50 is known to be powered up and ready to sense such wake-up signals.

Applications for the various embodiments of the devices and methods disclosed herein include, but are in no way limited to, galvanic isolators, magnetic galvanic isolators, capacitive galvanic isolators, coil transducers, microtransformers, miniature transformers, communication devices, high-speed communication devices, high voltage communication devices, transducers, transducer assemblies, semiconductor devices and hybrid devices.

It will now become apparent to those skilled in the art that the various embodiments of the inventions disclosed herein provide several advantages, including, but not limited to providing improved circuit performance, smaller packages or chips, lower power consumption, and faster data transmission rates.

Note further that included within the scope of the various embodiments of the inventions disclosed herein are methods of making and having made the various components, devices and systems described herein.

The above-described embodiments should be considered as examples, rather than as limiting the scope of the various inventions disclosed herein. In addition to the foregoing embodiments review of the detailed description and accompanying drawings will show that other embodiments are contemplated. Accordingly, many combinations, permutations, variations and modifications of the foregoing embodiments not set forth explicitly herein will nevertheless fall within the scope of the various inventions disclosed herein.

We claim:

1. A method of reducing the amount of power consumed by a galvanic isolator, comprising:
   transmitting a wake-up signal across an isolation medium from a transmitter when the transmitter is ready or preparing to transmit data or power signals to a receiver operably connected to a sensing circuit;
   receiving, with the sensing circuit, the wake-up signal through the isolation medium;
   in response to the sensing circuit receiving the wake-up signal, powering the receiver up from a sleep mode to an operating mode;
   after a period of time $t_{RDY}$ has passed since the wake-up signal was transmitted, transmitting a signature pattern from the transmitter to the sensing circuit through the isolation medium;
   verifying, with the sensing circuit or the receiver, the validity of the signature pattern and, if the signature pattern is determined to be valid, enabling the receiver to receive the data or power signals;
   transmitting the data or power signals from the transmitter through the isolation medium, and
   receiving, with the receiver, the data or power signals.

2. The method of claim 1, wherein the sensing circuit is operably connected to and powered substantially continuously by a first power source.

3. The method of claim 1, wherein the sensing circuit is operably connected to and powered intermittently by a first power source.

4. The method of either claim 2 or claim 3, wherein the first power source is independent from a second power source operably connected to, and configured to power, the receiver.

5. The method of either claim 2 or claim 3, wherein the first power source is configured to power both the sensing circuit and the receiver.

6. The method of claim 1, further comprising transmitting an end-of-transmission code from the transmitter to the sensing circuit after all the data or power signals have been transmitted to the receiver.

7. The method of claim 6, further comprising powering down the receiver from the operating mode to the sleep mode in response to the end-of-transmission code being received by the sensing circuit.

8. The method of claim 1, further comprising powering down the receiver from the operating mode to the sleep mode after a predetermined period of time has passed without any data or power signals being transmitted to the receiver by the transmitter.

9. The method of claim 1, further comprising powering down the receiver from the operating mode to the sleep mode after a predetermined period of time if the signature pattern is determined to be invalid.

10. The method of claim 1, wherein the isolation medium is capacitive, magnetic or optical.

11. The method of claim 1, further comprising transmitting the wake-up signal, the signature pattern, and the data and power signals through a single channel.

12. The method of claim 1, further comprising time-multiplexing the wake-up signal, the signature pattern, and the data and power signals through a single channel.

13. The method of claim 1, further comprising transmitting the wake-up signal, the signature pattern, and the data and power signals through two or more separate channels.

14. A reduced power consumption galvanic isolator, comprising:
a transmitter;
a receiver having a sensing circuit operably connected thereto;
a galvanic isolation medium located between the transmitter and the receiver;
wherein the transmitter is configured to transmit a wake-up signal across the isolation medium to the sensing circuit when the transmitter is ready or preparing to transmit data or power signals to the receiver, the sensing circuit is configured to receive the wake-up signal and cause the receiver to be powered up from a sleep mode to an operating mode when the wake-up signal is received, the transmitter further being configured to transmit a signature pattern to the sensing circuit or the receiver after a period of time $t_{RDY}$ has passed since the wake-up signal was transmitted, the sensing circuit or the receiver being configured to verify the validity of the signature pattern and, if the signature pattern is determined to be valid, to enable the receiver to receive the data or power signals, the receiver being configured to consume a reduced amount of electrical power during the sleep mode with respect to the operating mode.

15. The reduced power consumption galvanic isolator of claim 14, wherein the sensing circuit is operably connected to and powered substantially continuously by a first power source.

16. The reduced power consumption galvanic isolator of claim 14, wherein the sensing circuit is operably connected to and powered intermittently by a first power source.

17. The reduced power consumption galvanic isolator of either claim 15 or claim 16, wherein the first power source is independent from a second power source operably connected to, and configured to power, the receiver.

18. The reduced power consumption galvanic isolator of either claim 15 or claim 16, wherein the first power source is configured to power both the sensing circuit and the receiver.

19. The reduced power consumption galvanic isolator of claim 14, wherein the receiver is further configured to re-enter the sleep mode after no data or power signals have been received thereby for a predetermined period of time.

20. The reduced power consumption galvanic isolator of claim 14, wherein the galvanic isolation medium is capacitive, magnetic or optical.

21. The reduced power consumption galvanic isolator of claim 14, wherein the transmitter is further configured to transmit an end-of-transmission code to the receiver when all the data or power signals have been transmitted to the receiver.

22. The reduced power consumption galvanic isolator of claim 14, wherein the receiver is further configured to switch from the operating mode to the sleep mode in response to the end-of-transmission code having been received.

23. The reduced power consumption galvanic isolator of claim 14, wherein the receiver is further configured to power down from the operating mode to the sleep mode after a predetermined period of time has passed without any data or power signals having been transmitted to the receiver by the transmitter.

24. The reduced power consumption galvanic isolator of claim 14, wherein the receiver is further configured to power down from the operating mode to the sleep mode after a predetermined period of time if the signature pattern is determined to be invalid.

25. The reduced power consumption galvanic isolator of claim 14, wherein the transmitter comprises an integrated circuit (IC), and the receiver comprises an IC.

26. The reduced power consumption galvanic isolator of claim 14, wherein the transmitter and receiver ICs are encapsulated or overmolded to form a single package.

27. The reduced power consumption galvanic isolator of claim 14, wherein the receiver and the transmitter are connected electrically to separate respective grounds.

28. The reduced power consumption galvanic isolator of claim 14, wherein the transmitter is configured to transmit differential signals therethrough.

29. The reduced power consumption galvanic isolator of claim 14, wherein the receiver is configured to receive differential signals therethrough.

30. The reduced power consumption galvanic isolator of claim 14, wherein at least portions of the transmitter or the receiver are fabricated using one or more of a CMOS process, a Bipolar-CMOS process, and a combined Bipolar-CMOS-DMOS (BCD) process.

31. The reduced power consumption galvanic isolator of claim 14, wherein the galvanic isolator is encapsulated at least partially in polyimide or plastic.

32. The reduced power consumption galvanic isolator of claim 14, wherein the transmitter or receiver further comprises a common mode rejection (CMR) circuit.

33. The reduced power consumption galvanic isolator of claim 14, wherein the galvanic isolation medium, the transmitter and receiver are configured to transmit the wake-up signal, the signature pattern, and the data and power signals through a single channel.

34. The reduced power consumption galvanic isolator of claim 14, wherein the galvanic isolation medium, the transmitter and receiver are configured to time multiplex the wake-up signal, the signature pattern, and the data and power signals through a single channel.

35. The reduced power consumption galvanic isolator of claim 14, wherein the galvanic isolation medium, the transmitter and receiver are configured to transmit the wake-up signal, the signature pattern, and the data and power signals through two or more separate channels.

* * * * *